S. P. MULLIKEN & H. K. MOORE.
PROCESS OF MANUFACTURING ETHANE.
APPLICATION FILED DEC. 8, 1910.
1,107,696.
Patented Aug. 18, 1914.
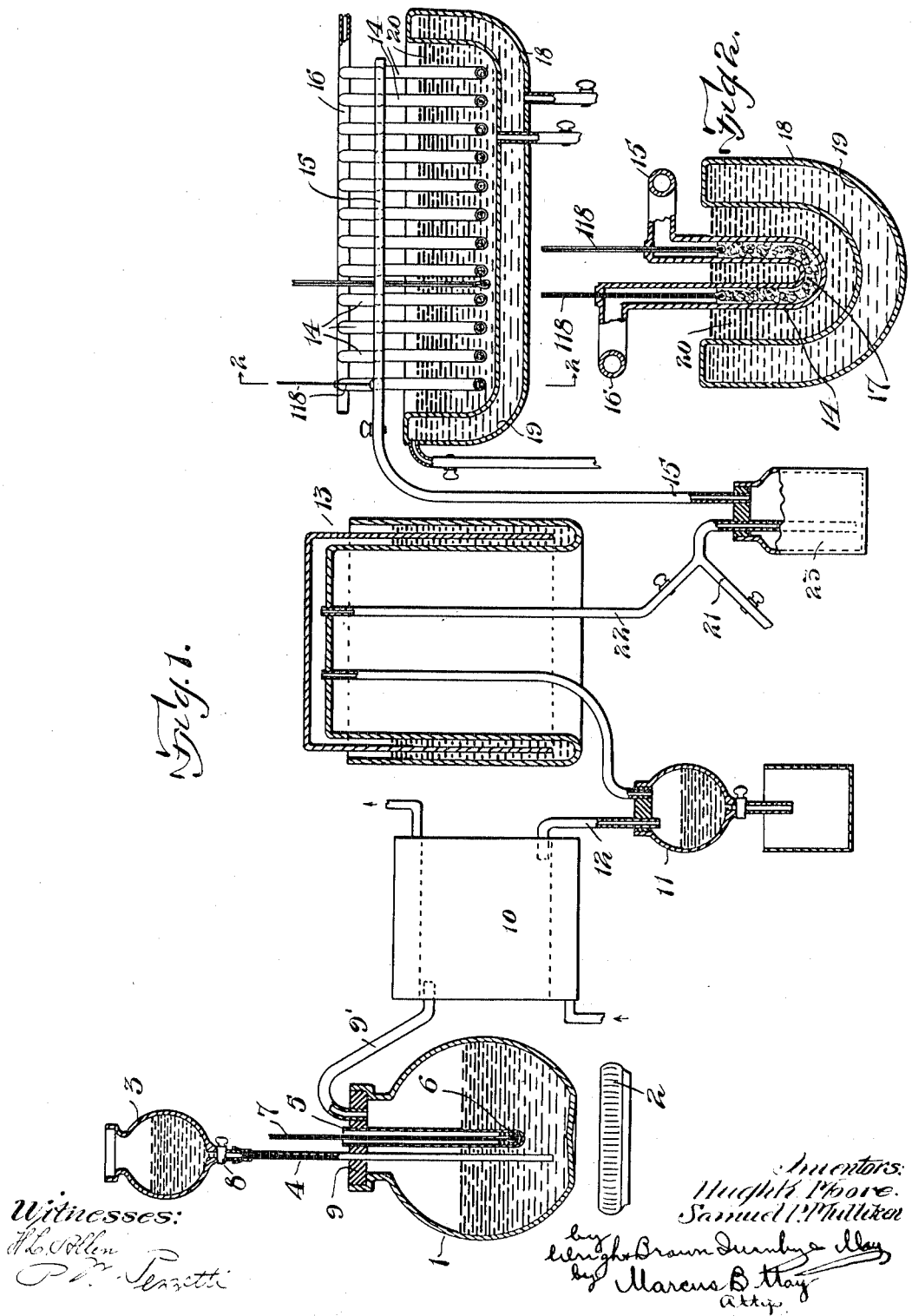

UNITED STATES PATENT OFFICE.

SAMUEL P. MULLIKEN, OF NEWBURYPORT, MASSACHUSETTS, AND HUGH K. MOORE, OF BERLIN, NEW HAMPSHIRE; SAID MULLIKEN ASSIGNOR TO SAID MOORE.

PROCESS OF MANUFACTURING ETHANE.

1,107,696.  Specification of Letters Patent.  Patented Aug. 18, 1914.

Application filed December 8, 1910. Serial No. 596,270.

*To all whom it may concern:*

Be it known that we, SAMUEL P. MULLIKEN and HUGH K. MOORE, respectively of Newburyport, in the county of Essex and State of Massachusetts, and Berlin, in the county of Coos and State of New Hampshire, have invented certain new and useful Improvements in Processes of Manufacturing Ethane, of which the following is a specification.

This invention has for its object the production of an exothermic compound from an endothermic compound, such for instance as an exothermic hydrocarbon gas from an unsaturated endothermic hydrocarbon gas, by a quantitative reaction carried on in the presence of a catalyzing agent, in consequence of which the desired product is substantially pure. We have discovered that by abstracting the heat liberated by the reaction, we are able to prevent secondary reactions and to produce a product which is substantially free from impurities and to prevent a rapid destruction of the catalytic properties of the catalyzing agent.

We hereinafter describe our process as we practise it in the manufacture of ethane ($C_2H_6$) from ethylene ($C_2H_4$) or acetylene ($C_2H_2$), but it will be understood that the process may be practised, using other endothermic compounds, without departing from our invention.

On the drawings,—Figure 1 illustrates, somewhat conventionally but in sufficient detail to enable one skilled in the art to follow the process, an apparatus embodying our invention for carrying out our process. Fig. 2 illustrates a transverse section on the line 2—2 of Fig. 1, and illustrates one of the conduits or receptacles containing the nickel asbestos-catalyzer and the adjacent instrumentalities.

Either ethylene or acetylene may be utilized for producing ethane. Acetylene, as is well known, is produced by the addition of water, $H_2O$, to calcium carbid, $CaC_2$, the reaction being expressed as

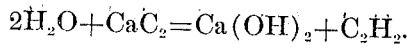
$$2H_2O + CaC_2 = Ca(OH)_2 + C_2H_2.$$

To produce ethylene, however, we preferably follow the following steps, reference being had to the drawing. We employ vessels or retorts as indicated at 1, made of fused quartz, since such vessels have a low coefficient of expansion, are resistant to the corrosion of the acid employed, and are of a highly refractory nature so that violent changes of temperature may occur without danger of fracturing the vessel. The vessel or retort may be made in any desirable shape, although the shape shown we find to be convenient. In the retort is placed syrupy phosphoric acid, $H_3PO_4$, which, by a heater indicated conventionally at 2, is raised to a temperature of 220° C. From a suitable source of supply, as a receptacle indicated at 3, ethyl alcohol, $C_2H_5OH$, is forced through a fine capillary tube 4, and injected into the phosphoric acid at a point below the surface of the acid and near the bottom of the receptacle 1. The result of the reaction may be expressed as follows:

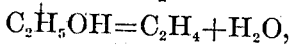
$$C_2H_5OH = C_2H_4 + H_2O,$$

the alcohol being split up and the resultant being ethylene and water. In all probability there is the intermediate formation of ethyl phosphoric acid and other similar compounds which in turn break up into ethylene, water and phosphoric acid. The ethylene and the water are carried off and with them probably small quantities of alcohol and oil of the paraffin series, and traces of ether.

For practically controlling the process of making the ethylene, we insert in the receptacle 1 a closed tube 5 which dips into the phosphoric acid and which contains at its lower end a body 6 of mercury. Into the mercury is introduced a bulb of a thermometer indicated at 7, which projects beyond the upper end of the tube, so that the operator may be certain to have the phosphoric acid at the proper temperature of 220° C. when the introduction of the alcohol takes place. The tubes 4 and 7, as well as that indicated at 5, may be made of fused quartz, although for this purpose it is possible to use glass which, however, is not as satisfactory. The flow of alcohol may be regulated by any convenient means as a valve 8. The tubes 4 and 5 are passed through a stopper or seal 9. The alcohol is forced by air pressure through the capillary tube 4, so that it is fed constantly but in minute quantities into the phosphoric acid at a point near the bottom of the retort. The injection of the alcohol into the phosphoric acid accomplishes the following result. The decomposition of the alcohol is greater, because the absorption of the alcohol to form ethyl phosphoric acid takes place at the bottom of the retort, while the liberation of the ethylene probably takes place from the ethyl phosphoric acid already formed at the top of the liquid. If, on the contrary, the alcohol were dropped on the surface of the acid, a large part of the alcohol would be vaporized by the intense heat and would pass over as alcohol vapor without any decomposition whatever. Again, by the injection of the alcohol through a fine capillary tube, a continuous feed of the alcohol below the surface of the acid is secured and "bumping" is prevented.

As a result of the operation described, ethylene, steam, small quantities of alcohol and oil, and traces of ether pass as vapors through the conduit 9' leading from the top of the retort and the entire product is passed through a condenser indicated at 10. Thence the condensed and uncondensed products pass to a separator 11 through a conduit 12, and the condensed water, alcohol, ether and oil will be trapped therein. The alcohol and water may be fractionated to obtain ethyl alcohol which can be used again for making ethylene, and the oil which floats on top may be subtracted in any convenient way. From the separator 11, the ethylene gas goes over in substantially pure condition to a gas tank indicated at 13 and is now in condition to be used for making ethane. Any convenient form of condenser, separator and gasometer may be used, and consequently they have been shown conventionally on the drawing.

For making ethane (an exothermic hydrocarbon gas) from ethylene (an endothermic unsaturated hydrocarbon gas,) the ethylene mixed with hydrogen is passed into contact with a nickel catalyzer which is made as follows. Long fibered asbestos is mechanically separated to make it as porous as possible like a light fluffy wool, so that gas may be forced freely therethrough and so that the fibers will present the greatest possible deposit surfaces. This must be shaken up with very fine nickel oxid, NiO, which may be in commercial form, until the asbestos will contain no more. This asbestos-nickel is then placed in small diameter tubes such as indicated at 14. Preferably each tube is from ¾ inch to an inch in diameter and is U-shaped. We employ a number of these tubes containing the nickel-asbestos catalyzer, the inlet ends of which are connected with a manifold inlet pipe 15 and the outlet ends of which are connected with a similar outlet pipe 16. In Fig. 2, the nickel-asbestos catalyzer is indicated at 17. Into each limb of each of the tubes is introduced a thermometer indicated at 118, the bulb of the thermometer being in contact with the nickel-asbestos just below the surface thereof. The tubes extend downwardly into a U-shaped elongated receptacle 18 which is chambered as at 19. After the tubes or receptacles 14 have been charged with the asbestos and nickel-oxid, the trough is filled with a medium which may be heated without vaporization to a high temperature, and for such medium we may use a high flash-point oil, molten tin or other easily fusible metal. By this medium, the asbestos and nickel-oxid are heated to a temperature of substantially 300° C., and, while so heated, pure hydrogen from a suitable source is passed through the tubes 14 to reduce the nickel-oxid to active nickel metal. The lower the temperature at which this reduction takes place, the more does the metal assume its active condition for with increases in temperature there is a corresponding decrease in the activity of the metal.

In actual practice, we find it advantageous to have the temperature not over 300° C. to secure the best results. The metal is deposited on the asbestos fibers in a state of separation, as it were, so as to permit free circulation of the gas thereto and secure a maximum exposed surface of the metal. The reaction may be expressed as follows:

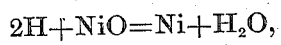

or possibly

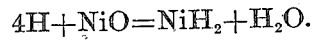

It is possible that, with the temperature conditions given, there may be a formation of nickel-hydrid, $NiH_2$, as stated. By connecting a condenser with the tube, the completion of the reduction can be ascertained by the fact that there will be no further condensation of water. Now still maintaining the flow of hydrogen (to prevent the entrance of air and consequent oxidation of the nickel), the heated medium 20 is withdrawn and there is substituted therefor brine or other medium which may be refrigerated and still remain liquid. Then into the chamber 19 of the receptacle 20 is introduced an artificially chilled medium to reduce the temperature of the medium in the trough to a very low temperature, for instance —13° C. or even lower if possible. Into the stream of hydrogen which is being introduced through the inlet pipe 21 there is introduced a stream of ethylene from the pipe 22 leading from the gas tank 13. These two gases are mixed in a mixing chamber 23 and they are passed through the inlet pipe 15 into the tubes 14 and through the catalyzer therein contained, to wit, the nickel-asbestos. The ethylene is reduced to ethane by the addition of hydrogen. It has been stated that ethylene is an endothermic compound whereas ethane is an exothermic compound. Consequently the reduction of ethylene to ethane takes place with the liberation of heat and it is for the removal of this heat that the refrigerant is employed so that greater volumes of gas may be employed than would be otherwise possible—that is, we maintain the temperature of the catalyzer at the lowest possible practicable temperature by abstracting the heat liberated by the reaction.

We find that it is desirable, in order to avoid secondary reactions, that the temperature of the nickel-asbestos should not rise materially over 150° C. and that, when the temperature rises above that point, the rate of liberation of heat is greater than the capacity of heat absorption of the refrigerant, and consequently less mixed gases must be supplied to the catalyzer or else the refrigerating medium should be chilled to a lower temperature. On the other hand, however, the flow of each constituent gas should be regulated to prevent the temperature of the catalyzer from rising above a given working temperature, (in any event not more than 150° C.,) in order that the reaction to form ethane may be quantitative, for in the manufacture of ethane from ethylene, the ethylene and the hydrogen should be supplied in equal quantities—that is, with a given flow of hydrogen, the flow of the ethylene is gradually increased until the temperature ceases to rise, say until it reaches a given point; then, if the temperature thereafter drops, the flow of ethylene is increased until the temperature is brought back to the given point. If the temperature rises above such point, the flow of hydrogen may be reduced until the temperature is restored to the given point. Consequently by watching the thermometer and noting variations in temperature, the flow of the different gases may be regulated to maintain the given working temperature, other conditions being equal. The final reaction may be represented as follows:

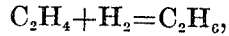

although probably the reaction does not take place by this one step but is preceded by the hypothetical intermediate reaction as follows:

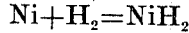

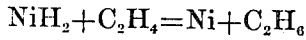

or again

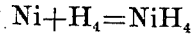

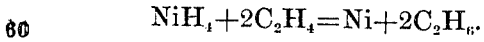

In carrying out the foregoing process, the ethylene gas may be subjected to purification and drying by any well known method if found desirable, as should the hydrogen which is used in the process.

In making ethane from acetylene, the same process is followed except that we prefer to employ tubes of smaller diameter for the catalyzer, such for instance tubes approximately ¾ of an inch in diameter. To secure a quantitative reaction, the acetylene and hydrogen must be fed to the catalyzer in the proportion of 2 parts by volume of hydrogen to 1 part by volume of acetylene, and, in this case, owing to the great amount of heat liberated due to the greater endothermic properties of the acetylene, the temperature of the refrigerant should be preferably much lower than that of the refrigerant used in the reduction of ethylene to ethane, for it is of the utmost importance that the heat which results from the change of the highly endothermic compound into an exothermic compound should be simultaneously conducted away to prevent the decomposition of the endothermic compound. The lower the temperature of the refrigerant, the more perfect will the reaction be. The maximum temperature, as shown by the thermometers 18 in the manufacture of ethane, should not be permitted to rise over 150° C. to secure the best results, and may be kept as much lower as the temperature of the refrigerant will permit. The reaction may be expressed as follows:

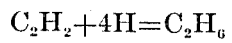

or

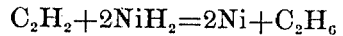

or

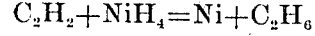

for the reasons previously given.

We have called the nickel-asbestos a catalyzer as it may and probably does possess the necessary catalytic properties, although it is possible, theoretically, that the nickel is changed to nickel hydrid and the hydrogen is simultaneously liberated.

We have pointed out that both acetylene and ethylene are gases having endothermic properties, those of acetylene being greater than those of ethylene. By conducting away the heat liberated in the reduction of these gases to ethane by the employment of a refrigerant, we are able to prevent the fusing or matting of the nickel which would cause the latter to lose its catalytic properties. Moreover when the heat is not conducted away, the liberation of the heat causes the decomposition of the ethylene or acetylene and the nickel becomes coated with soot in addition to its being matted and sintered together so that the passage of the gas through it after a time is prevented. With our apparatus and process, however, the gases are always able to flow through the catalyzer and we are able to produce a substantially pure ethane gas. For the purpose of assisting the conduction away of the heat liberated by the endothermic reaction, we find it desirable to use tubes of small diameter. Not only is the gas a poor conductor of heat, but the asbestos is likewise a poor conductor, and thus, by making the tubes of small diameter, the refrigerant may be brought close to the catalyzer and to the gases, to conduct away the heat substantially simultaneously with its liberation.

We have herein stated that the temperature of the catalyzer should not exceed 150° C. We do not thereby mean that 150° C. is the optimum temperature. The fact that the temperature rises this high is due to the increased yield of ethane and the difficulty of practically securing a refrigerant which will take up or absorb all of the liberated heat. We prefer, in fact, a temperature not over zero C., but, as stated, it is difficult to maintain this temperature of the catalyzer practically, on account of our inability to secure a complete refrigeration with the large yield that is obtained.

In the experiments of Sabatier and Senderens, which are described in *Compte Rendu*, 1897, tome 124, and also described by them in *Annales de Chimie et de Physique*, 1905, vol. 4, 8 series, they experimented with the reduction of ethylene by hydrogen in the presence of metallic catalyzers. Sabatier and Senderens found it necessary to warm the nickel and to supply an excess of ethylene, pointing out that a notable elevation of temperature will be observed in the formation of the ethane. It is further stated that the reaction goes on more rapidly if the experimenter heats the catalyzer to 130° to 150° C.

The notable difference between the experimental process of Sabatier and Senderens and the process which we have described herein is that we are able to produce commercially large quantities of ethane for use in the industries due to the fact that the catalyzer is refrigerated by a suitable refrigerating means. By employing the same quantities of nickel which Sabatier and Senderens described in their experiments, we have been able to secure a yield which is nearly 100,000 times the yield which Sabatier and Senderens obtained, according to their statement, in the same period of time. It will be apparent, of course, that with a tremendously increased yield of ethane, there is a corresponding production of heat, and that this heat was absorbed or abstracted, according to our process, by the refrigerant. It is not necessary, as alleged by Sabatier and Senderens, that the catalyzer should be warmed in order to secure the reaction, as in actual practice we have found that we secure the reaction where the temperature of the catalyzer and gases is reduced to $-13°$ C. The probabilities are that the reaction would take place at very much lower temperatures, but, up to the present time, we have been unable to secure a temperature lower than $-13°$ C. because of the lack of proper commercial facilities.

In the tubes containing the catalyzing agent, the reaction takes places near the surface at the inlet end of the tube, and if working properly, it should take place within a space extending not over an inch and a half below said surface. The thermometer, at the outlet end of the tube, enables the operator to determine when the catalyzing agent becomes inactive or deteriorates, for in such case the thermometer will indicate a marked rise in temperature.

It will be understood that we are not limited to the particular form of apparatus which we have shown, and that the catalyzer may well be located in any convenient receptacle through which the gases may be caused to flow, and we do not herein claim the method of making ethylene herein described.

Having thus explained the nature of our said invention and described a way of constructing and using the same, although without attempting to set forth all of the forms in which it may be made or all of the modes of its use, what we claim is:

1. The herein described method of changing an endothermic compound to an exothermic compound, which consists in subjecting the endothermic compound in the presence of a reducing agent to catalytic action and simultaneously refrigerating the product to abstract the heat liberated by the reaction.

2. The herein described method of producing an exothermic gas from an endothermic gas, which consists in reducing the endothermic gas in the presence of a catalyzer and simultaneously refrigerating the product to abstract heat liberated by the reaction.

3. The herein described process of producing an exothermic hydrocarbon gas from an endothermic hydrocarbon gas, which consists in reducing the endothermic gas by hydrogen in the presence of a catalyzer, and simultaneously refrigerating the catalyzer and the product.

4. The herein described process which consists in reducing an unsaturated hydrocarbon gas by hydrogen in the presence of a catalyzer, regulating the flow of gases to provide the proper amounts required for the reaction, and simultaneously refrigerating the catalyzer and the product.

5. The herein described process of making ethane, which consists in reducing ethylene by hydrocarbon in the presence of a catalyzer, and refrigerating the catalyzer to abstract heat liberated by the reaction.

6. The herein described process of making ethane, which consists in reducing an endothermic hydrocarbon gas by hydrogen in the presence of a catalyzer deposited in a porous inert material, and refrigerating said catalyzer and said material to abstract heat liberated by the reaction.

7. The herein described process of making ethane, which consists in reducing an unsaturated hydrocarbon gas by hydrogen in the presence of a catalyzer, refrigerating the catalyzer, and regulating the quantitative flow of gases to prevent heating of the catalyzer to a temperature above 150° C.

In testimony whereof we have affixed our signatures, in presence of two witnesses.

SAMUEL P. MULLIKEN.
HUGH K. MOORE.

Witnesses to S. P. M.:
  Forrest R. Roulstone,
  P. W. Pezzetti.

Witnesses to H. K. M.:
  E. Batchelde,
  P. W. Pezzetti.